United States Patent
Bussan

(10) Patent No.: US 8,432,158 B2
(45) Date of Patent: Apr. 30, 2013

(54) APPARATUS AND METHOD FOR DETERMINING SPEED AND DIRECTION OF SLOTTED TARGETS UTILIZING DUAL MAGNETIC SENSOR PACKAGING

(75) Inventor: Anthony J. Bussan, Davis Junction, IL (US)

(73) Assignee: Honeywell International Inc., Morristown, NJ (US)

( * ) Notice: Subject to any disclaimer, the term of this patent is extended or adjusted under 35 U.S.C. 154(b) by 526 days.

(21) Appl. No.: 12/244,505

(22) Filed: Oct. 2, 2008

(65) Prior Publication Data

US 2010/0085040 A1 Apr. 8, 2010

(51) Int. Cl.
*G01B 7/14* (2006.01)
*G01R 33/09* (2006.01)

(52) U.S. Cl.
USPC ............ 324/207.21; 324/173; 324/207.25; 324/244; 338/32 R

(58) Field of Classification Search .......... 324/160–180, 324/207.11–207.25
See application file for complete search history.

(56) References Cited

U.S. PATENT DOCUMENTS

| | | | | |
|---|---|---|---|---|
| 4,370,614 A * | 1/1983 | Kawada et al. | ............... | 324/173 |
| 4,488,113 A * | 12/1984 | Heemstra | ............... | 324/207.19 |
| 4,647,892 A | 3/1987 | Hewitt | ............... | 336/83 |
| 4,821,560 A | 4/1989 | Kohlbauer | ............... | 73/117.3 |
| 5,359,287 A * | 10/1994 | Watanabe et al. | ............... | 324/207.21 |
| 6,324,905 B2 | 12/2001 | Noltemeyer et al. | ............... | 73/207.25 |
| 6,346,808 B1 * | 2/2002 | Schroeder | ............... | 324/207.21 |
| 6,690,155 B2 | 2/2004 | Vig et al. | ............... | 324/207.12 |
| 7,592,803 B1 * | 9/2009 | Guo et al. | ............... | 324/207.25 |
| 7,834,616 B2 * | 11/2010 | Stolfus et al. | ............... | 324/174 |
| 2001/0009367 A1 * | 7/2001 | Seitzer et al. | ............... | 324/207.21 |
| 2003/0102860 A1 * | 6/2003 | Haji-Sheikh et al. | ............... | 324/174 |
| 2004/0021457 A1 * | 2/2004 | Johnson | ............... | 324/161 |
| 2004/0100251 A1 * | 5/2004 | Lohberg | ............... | 324/166 |
| 2004/0257070 A1 | 12/2004 | Takuma | ............... | 324/207.22 |

FOREIGN PATENT DOCUMENTS

WO WO 2006/083479 A1 8/2006

* cited by examiner

*Primary Examiner* — Jermele M Hollington
*Assistant Examiner* — Emily Chan
(74) *Attorney, Agent, or Firm* — Shumaker & Sieffert, P.A.

(57) ABSTRACT

A magnetic sensing apparatus and method that determines the speed and direction of gears or slotted targets. A magnet can be placed proximate to the slotted target to create a magnetic field. An integrated circuit is formed on a substrate containing two or more magnetoresistive sensors occupying the same area. This integrated circuit is biased from the magnet which is placed in close proximity. The magnetoresistive sensors are intertwined with the first magnetoresistive sensor, offset from the second magnetoresistive sensor. The magnetoresistive sensors produce phase shifted output signals representing magnetic flux flowing through the magnetoresistive sensors such that the magnetoresistive sensors are reactive to gap and angular changes in the circular track of the ferrous target. The phase shift of the signals needed to determine direction is sufficiently maintained for a variety of target feature sizes and spacing.

20 Claims, 6 Drawing Sheets

APPARATUS AND METHOD FOR DETERMINING SPEED AND DIRECTION OF SLOTTED TARGETS UTILIZING DUAL MAGNETIC SENSOR PACKAGING

TECHNICAL FIELD

Embodiments are generally related to sensing devices and components thereof. Embodiments are also related to magnetic sensor devices. Embodiments are particularly related to Anisotropic Magnetoresistive ("AMR") devices. Embodiments are additionally related to integrated circuits.

BACKGROUND OF THE INVENTION

Magnetic sensors are widely used to detect the speed and direction of movement of a gear or slotted target. Magnetic sensors can be placed within a magnetic field created between a magnet and a gear or slot-patterned target. As the gear rotates, the tooth/slot pattern of the target changes the magnetic field pattern created by the magnet. The magnetic sensor can detect whether the magnet is facing a slot or a tooth by the difference in the magnetic field strength. This difference in magnetic field strength can be detected despite not being in contact with the target.

The magnetic field strength detected by the magnetic sensor is dependent on the space between the magnetic sensor, the magnet, and the gear or slot-patterned target. Therefore, this space must be held constant. If the space between these three components is not held constant, a change will occur in the magnetic field strength detected by the magnetic sensor.

Magnetic sensors are also referred to as proximity sensors and geartooth sensors. There are generally two types of magnetic sensors: Hall sensors and magnetoresistive sensors. Hall sensors can be employed in some sensing applications to detect the magnetic field strength component in a direction perpendicular to the sensing plane of the sensor. Magnetoresistive sensors, on the other hand, are capable of detecting magnetic field strength or angle in a direction within the sensing plane of the magnetoresistive element and perpendicular to its thinnest dimension. Magnetoresistive sensors also offer higher sensitivities and superior performance to that of the Hall sensors. Magnetoresistive sensors come in different types. These are ordinary magnetoresistors (MR), anisotropic magnetoresistors (AMR), giant magnetoresistors (GMR), colossal magnetoresistors (CMR), and so forth.

Several methods using magnetic sensors have been implemented to determine the speed and direction of movement of a gear or other slotted target. In some configurations, two magnetic sensors (e.g., Hall, magnetoresistive, or variable reluctance), for example, can be spaced a fixed distance in order to produce two signals with shifted phase. In such a scenario, the phase shift can be used to calculate the direction of movement of the target. This phase shift is highly dependent on the spacing of the two sensor elements relative to the size and spacing of the target features.

A distinct and different spacing of sensor elements is, therefore, needed for every different target feature size and spacing in order to produce optimum phase shift between signals. The sensor elements must be accurately placed during manufacturing of the sensor package, or are dynamically tuned and adjusted to maintain the phase shift. The resulting sensor system package must also maintain this spacing throughout the operating environment and life of the system. Phase shift errors lead to miscalculation of direction and speed. Attempts to use a given sensor system with targets of different feature size and spacing typically lead to errors.

It is therefore believed that a solution to these problems involves the design and implementation of an improved apparatus and method for determining the speed and direction of slotted-targets, as disclosed in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved sensing device.

It is another aspect of the present invention to provide for an improved magnetic sensor.

It is yet another aspect of the present invention to provide for an improved anisotropic magnetoresistive (AMR) sensor to determine the speed and direction of a gear or slotted target.

The aforementioned aspects and other objectives and advantages can now be achieved as described herein. A magnetic sensing apparatus and method are disclosed, which includes a ferrous target containing teeth and slots forming a circular track as in a gear. A magnet is placed proximate to the ferrous slotted target to create a magnetic field. An integrated circuit is formed on a substrate containing at least two magnetoresistive sensors occupying the same area. This integrated circuit is biased from the magnet which is placed in close proximity. The magnetoresistive sensors are intertwined with the first magnetoresistive sensor, offset from the second magnetoresistive sensor in angle and or position. The magnetoresistive sensors produce an output signal representing magnetic flux flowing through the magnetoresistive sensors such that the magnetoresistive sensors are reactive to gap changes and angle of magnetic flux in the circular track of the ferrous target.

The first magnetoresistive sensor is connected to the second magnetoresistive sensor, rotated with respect to one another in a bridge configuration. The output signals produced from this configuration are naturally shifted in phase and converted to digital signals. A calculation component, microprocessor, for example, is used to analyze the output signal and saved using a memory device.

When a gear or other slotted profile target is present or moving in front of the magnetoresistive sensor, it outputs two phase shifted signals. The phase shift of the signals needed to determine direction is sufficiently maintained for a variety of target feature size and spacing. This is possible because the sensor operates on the principle of the angle of the target features in relation to the bridges and not the size and spacing of the target features in relation to the sensor element spacing in the Cartesian plane. The bridges are rotated with respect to one another such that the bridge signals are naturally shifted in phase. The rotational relationship of the two bridges is set at the integrated circuit wafer process and, hence, is not a critical parameter in the rest of the manufacturing process.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1A:
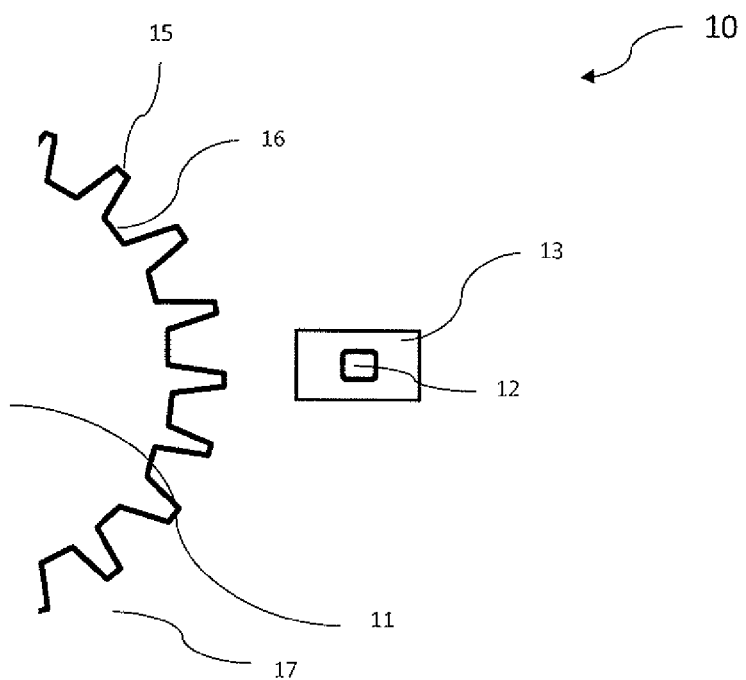
FIG. 1A illustrates a perspective view of a gear or slotted target speed and direction sensor, which can be adapted for use in accordance with a preferred embodiment.
Figure 1B:
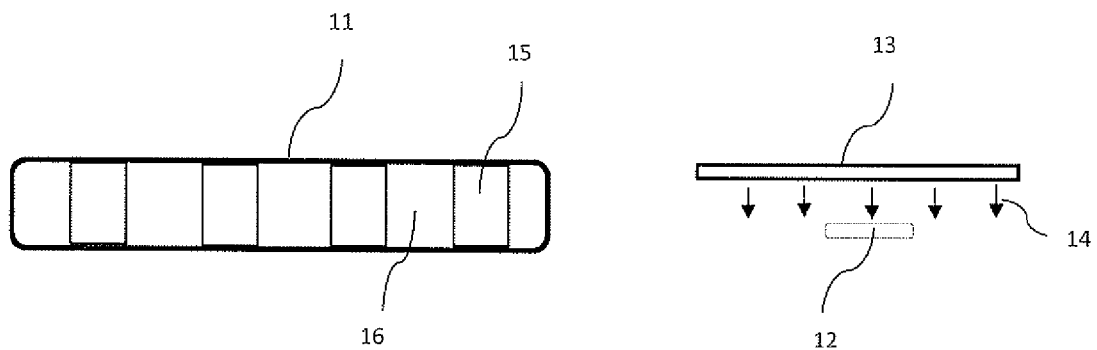
FIG. 1B illustrates a top view of a gear or slotted target speed and direction sensor as illustrated in FIG. 1A.

FIG. 1A and FIG. 1B illustrate a perspective view 10 of a magnetic gear and/or slotted target speed and direction sensing apparatus 12, which can be adapted for use in accordance with a preferred embodiment. A magnet 13 generates a magnetic field 14 between the magnet 13 and a circular track 17 of slotted target 11 containing teeth 15 and slots 16. The magnetic sensing apparatus 12 senses changes in the magnetic field and produces output signals representative of the magnetic flux.

Figure 2A:
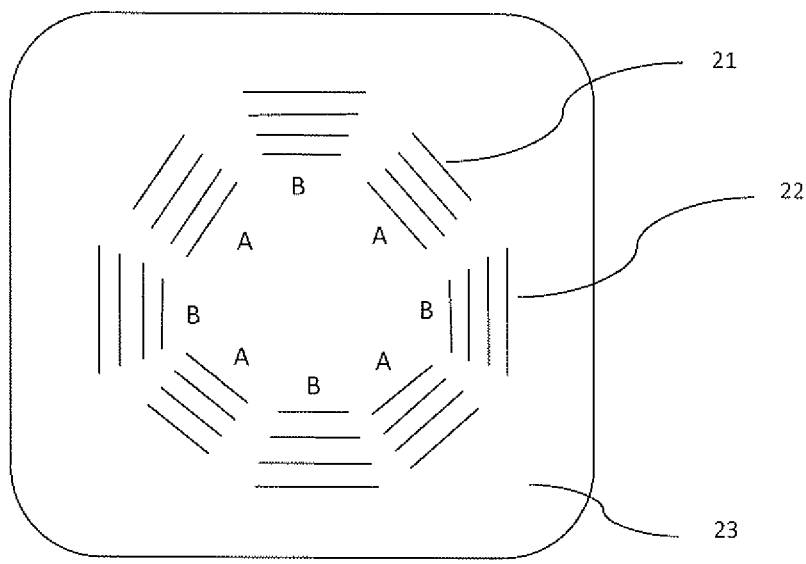
FIG. 2A illustrates a perspective view of an integrated circuit with bridge configuration of magnetoresistive sensors that are intertwined with the first magnetoresistive sensor offset from the second magnetoresistive sensor, which can be adapted for use in accordance with a preferred embodiment.

FIG. 2A illustrates a perspective view of an integrated circuit with bridge configuration of magnetoresistive sensors 21 and 22 that are intertwined with the first magnetoresistive sensor 21 offset from the second magnetoresistive sensor 22, which can be adapted for use in accordance with a preferred embodiment. The lines represent magnetoresistive runners. The magnetoresistive sensors 21 and 22 are placed on a substrate 23.

Figure 2B:
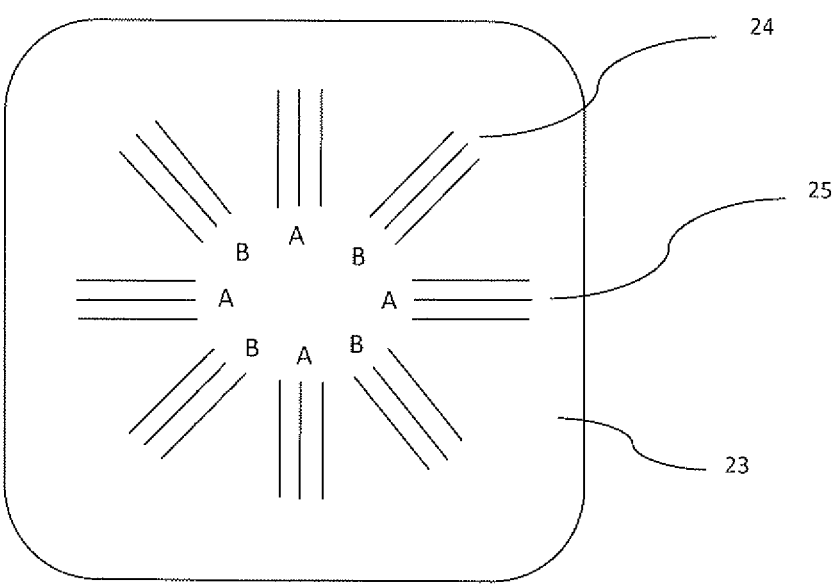
FIG. 2B illustrates an additional perspective view of an integrated circuit with bridge configuration of magnetoresistive sensors that are intertwined with the first magnetoresistive sensor offset from the second magnetoresistive sensor, which can be adapted for use in accordance with a preferred embodiment.

FIG. 2B illustrates an additional perspective view of an integrated circuit with bridge configuration of magnetoresistive sensors 24 and 25 that are intertwined with the first magnetoresistive sensor 24 offset from the second magnetoresistive sensor 25, which can be adapted for use in accordance with a preferred embodiment. The lines represent magnetoresistive runners. The magnetoresistive sensors 24 and 25 are placed on a substrate 23.

Figure 3A:
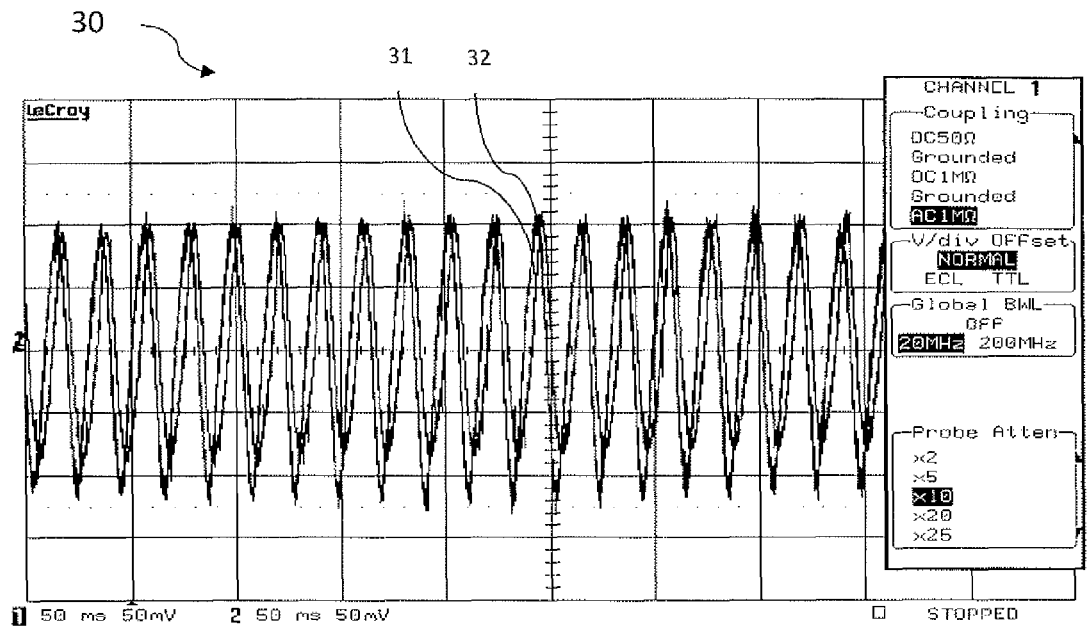
FIG. 3A illustrates graphs depicting changes in magnetic flux as detected by two anisotropic magnetoresistors from a clockwise rotating gear or slotted target speed and direction sensor as illustrated in FIGS. 1A and B.
Figure 3B:
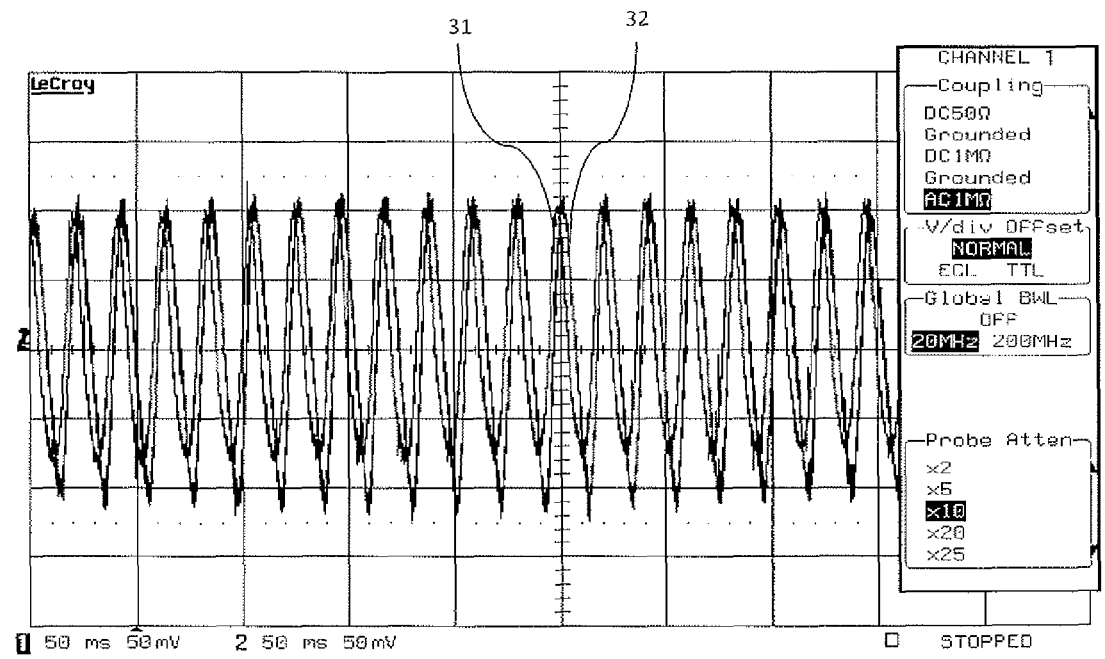
FIG. 3B illustrates graphs depicting changes in magnetic flux as detected by two anisotropic magnetoresistors from a counterclockwise gear or slotted target speed and direction sensor as illustrated in FIGS. 1A and B.

FIG. 3A illustrates a graph 30 depicting changes in magnetic flux as detected by two magnetoresistors 21 and 22 from a gear or slotted target speed and direction sensing apparatus of FIG. 1A and FIG. 1B. When a gear or other slotted profile target 11 is moving in a clockwise direction in front of the magnetoresistive sensing apparatus 12, it outputs two phase shifted signals 31 and 32 corresponding to each of the two magnetoresistors 21 and 22. FIG. 3B illustrates the results illustrated in FIG. 3A when the gear or other slotted profile target 11 is moving in a counterclockwise direction.

Figure 4A:
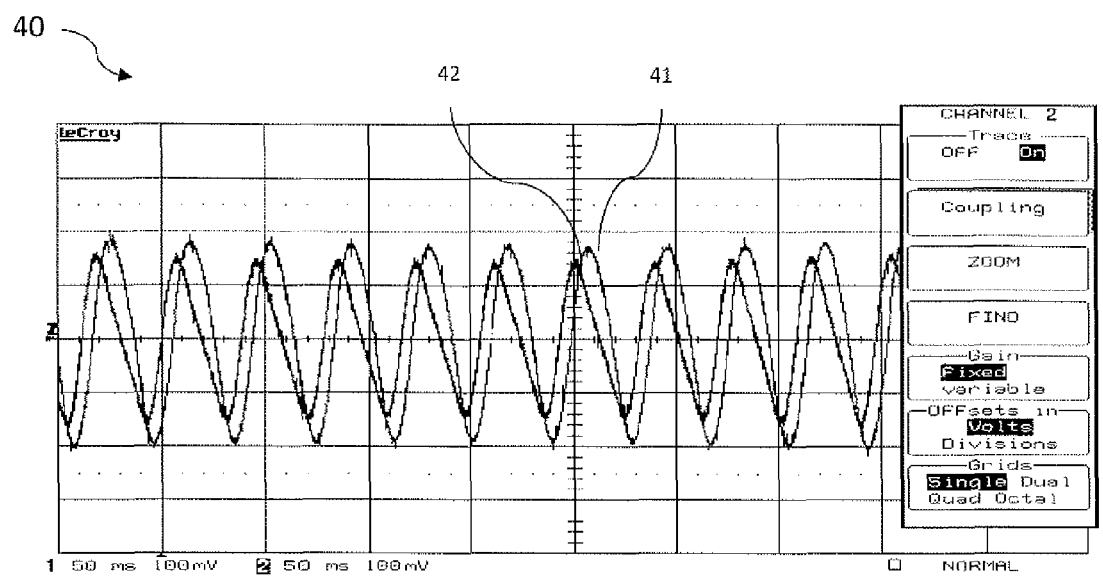
FIG. 4A illustrates additional graphs depicting changes in magnetic flux as detected by two anisotropic magnetoresistors from a clockwise rotating gear or slotted target speed and direction sensor as illustrated in FIGS. 1A and B.
Figure 4B:
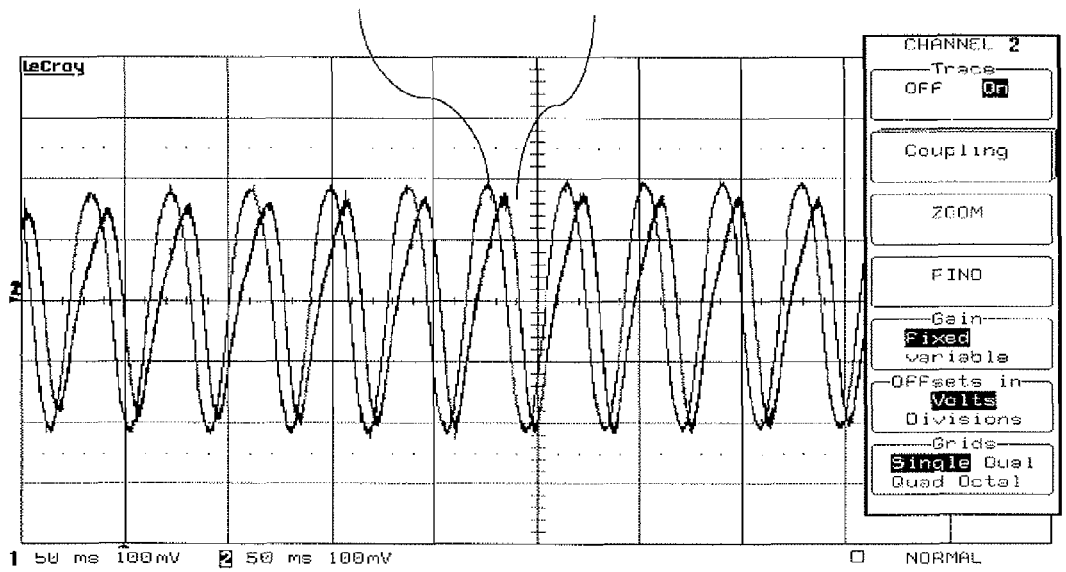
FIG. 4B illustrates additional graphs depicting changes in magnetic flux as detected by two anisotropic magnetoresistors from a counterclockwise gear or slotted target speed and direction sensor as illustrated in FIGS. 1A and B.

FIG. 4A illustrates a graph 40 depicting changes in magnetic flux as detected by two magnetoresistors 21 and 22 from a gear or slotted target speed and direction sensing apparatus of FIG. 1A and FIG. 1B. The graphs of FIG. 4A shows a different teeth 15 and slot 16 size as compared to that of FIG. 4B. When a gear or other slotted profile target 11 is moving in a clockwise direction in front of the magnetoresistive sensing apparatus 12, it outputs two phase shifted signals 41 and 42 corresponding to each of the two magnetoresistors 21 and 22. FIG. 4B illustrates the results illustrated in FIG. 4A when the gear or other slotted profile target 11 is moving in a counterclockwise direction.

Despite the variance in size of the graphs 41 and 42 as compared to graphs 31 and 32, the phase shift of the signals needed to determine direction is sufficiently maintained for a variety of target feature size and spacing. This is possible because the sensor operates on the principle of the angle of the target features in relation to the bridges rather than the size and spacing of the target features in relation to the sensor element spacing in the Cartesian plane. The bridges can be rotated with respect to one another such that the bridge signals are naturally shifted in phase. The rotational relationship of the two bridges is preferably set at the integrated circuit 57 wafer process and, hence, is not a critical parameter in the rest of the manufacturing process.

Figure 5:
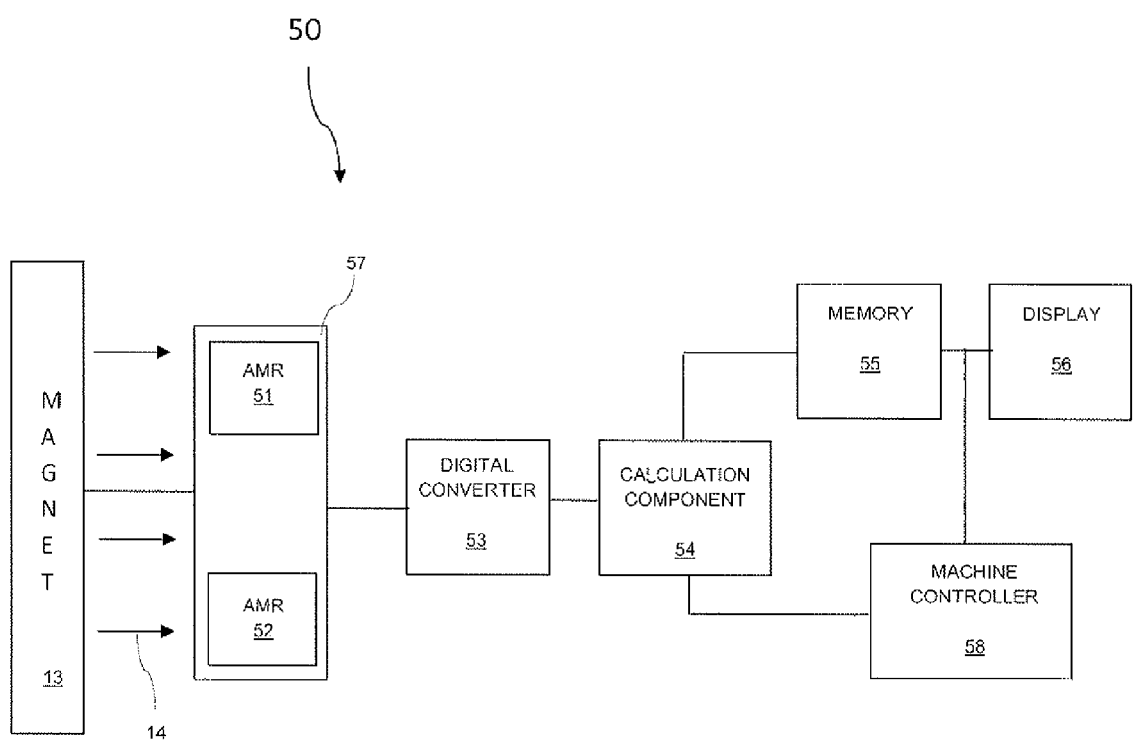
FIG. 5 illustrates a block diagram of a system for detecting speed and direction of gears or slotted targets, in accordance with a preferred embodiment.

FIG. 5 illustrates a block diagram 50 of a magnetoresistive sensor system for detecting the speed and direction of gears or slotted targets, in accordance with a preferred embodiment. An integrated circuit 57 is formed on a substrate containing at least two magnetoresistive sensors 51 and 52 occupying the same area. This integrated circuit 57 is biased from the magnet 13 which is placed in close proximity. The magnetoresistive sensors 51 and 52 are intertwined in a bridge configuration with the first magnetoresistive sensor 51 offset from the second magnetoresistive sensor 52. The magnetoresistive sensors produce an output signal representing magnetic flux flowing through the magnetoresistive sensors 51 and 52 such that the magnetoresistive sensors are reactive to gap changes in the circular track 17 of the ferrous target 11.

The first magnetoresistive sensor 51 is connected to the second magnetoresistive sensor 52, rotated with respect to one another in a bridge configuration. The output signals produced from this configuration are naturally shifted in phase and converted to digital signals from the digital converter 53. A calculation component 54, microprocessor, for example, is used to analyze the output signal and saved using a memory device 55. The data can be viewed by a display component 56, usually a video screen. In addition, the machine controller 58 interacts with the components described in this apparatus.

Figure 6:
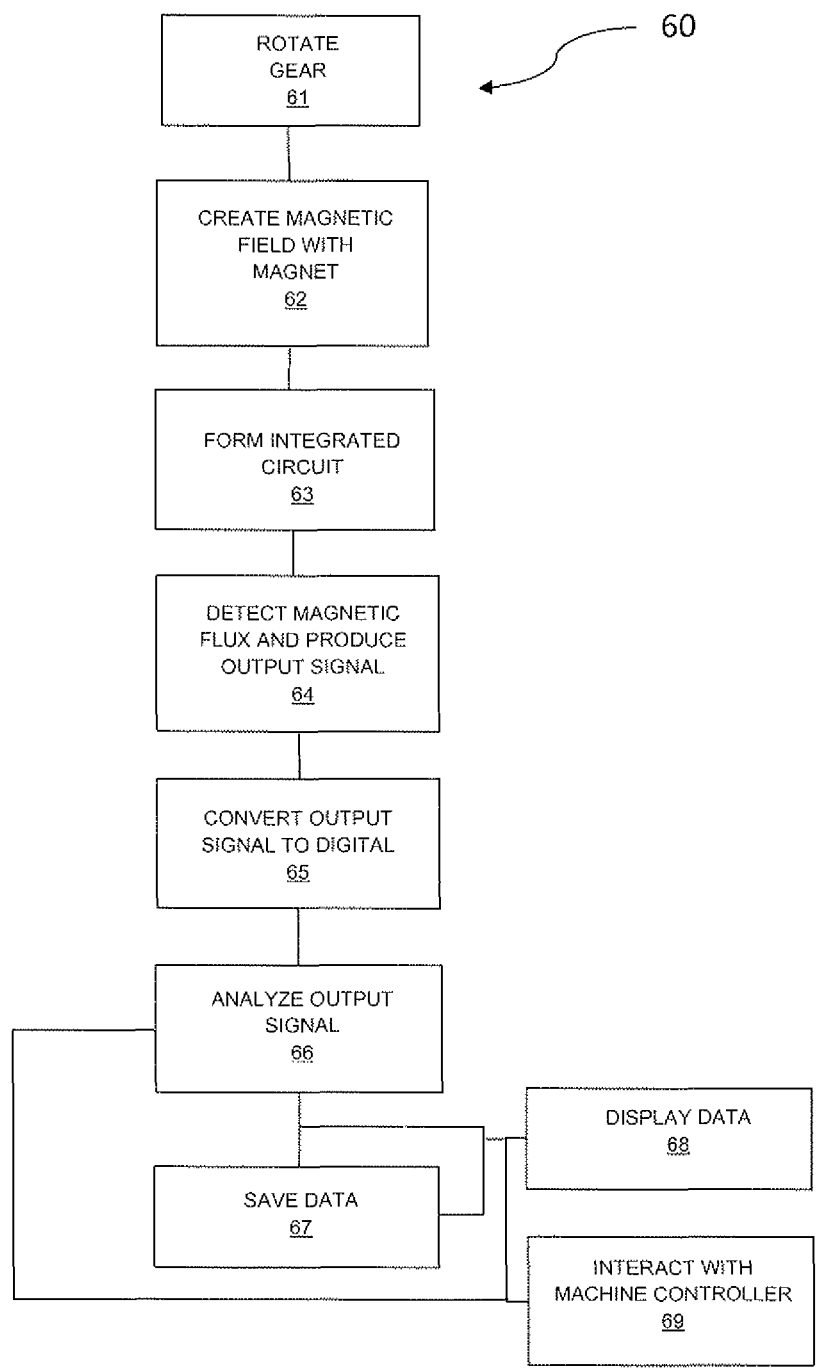
FIG. 6 illustrates a high-level diagram of a system for detecting speed and direction of gears or slotted targets, which can be adapted for use in accordance with a preferred embodiment.

FIG. 6 illustrates a high-level diagram of a method 60 for detecting speed and direction of gears or slotted targets, which can be adapted for use in accordance with a preferred embodiment. As indicated at block 61, the rotation of a ferrous slotted target 11 creates a repetitious change in the magnetic field 14 created by magnet 13 and uniform teeth 15 and slots 16. Placing a magnet 13 located proximate to the ferrous slotted target 11 creates a uniform magnetic field as depicted at block 62. Thereafter, as indicated at block 63, an integrated circuit 57 can be formed on a substrate, where the integrated circuit 57 includes bridge configured intertwined magnetoresistive sensors 51 and 52 occupying the same area on the integrated circuit 57 as depicted in FIG. 5.

As indicated next at block 64, output signals representative of magnetic flux flowing through magnetoresistive sensors 51 and 52 are produced, wherein the magnetoresistive sensors 51 and 52 are reactive to gap and angular changes created in the circular track 17 of teeth 15 and slots 16 of the slotted target. It is further appreciated that magnetoresistive sensors 51 and 52 comprise AMR components. The output signals from the first magnetoresistive sensor 51 and second magnetoresistive sensor 52 are naturally shifted in phase. Thereafter, as described at block 65, the output signal can be converted into a digital form. The converted output signal can be analyzed as depicted at block 66 and the resulting data stored in a memory 55, and viewed by a display 56. The machine controller interacts as indicated at block 69 with the analyze output signal (see block 66), save data (see block 67), and display data (see block 68) functions.

It can be further appreciated that the method includes connecting the first magnetoresistive sensor 21 to the second magnetoresistive sensor 22 rotated with respect to one another in a bridge configuration and biasing the integrated circuit 57 with the magnet 13 in close proximity to the integrated circuit 57.

It will be appreciated that variations of the above-disclosed and other features and functions, or alternatives thereof, may be desirably combined into many different systems or applications. Also that various presently unforeseen or unanticipated alternatives, modifications, variations or improvements therein may be subsequently made by those skilled in the art which are also intended to be encompassed by the following claims.

What is claimed is:

1. A magnetic sensor apparatus, comprising:
   a magnet located proximate to a ferrous target having a circular track, wherein the magnet generates a magnetic field between the magnet and the circular track of the ferrous target; and
   a plurality of intertwined magnetoresistive sensors occupying the same space on a substrate such that the plurality of intertwined magnetoresistive sensors sense changes in the magnetic field generated by the magnet, said plurality of intertwined magnetoresistive sensors comprising a first magnetoresistive sensor offset from a second magnetoresistive sensor, wherein said first magnetoresistive sensor and said second magnetoresistive sensor together produce output signals representative of magnetic flux of the magnetic field generated by the magnet and flowing through said first magnetoresistive sensor and said second magnetoresistive sensor,
   wherein said first magnetoresistive sensor and said second magnetoresistive sensor are reactive to gap and angular changes in said circular track of said ferrous target, such that said output signals from said first magnetoresistive sensor and said second magnetoresistive sensor are naturally shifted in phase in order to achieve a magnetically biased magnetoresistive speed and direction sensor.

2. The apparatus of claim 1 wherein an integrated circuit is formed on said substrate.

3. The apparatus of claim 1 wherein said circular track comprises a plurality of teeth and slots.

4. The apparatus of claim 1 wherein said ferrous target comprises a slotted target.

5. The apparatus of claim 1 wherein said magnetoresistive sensors are placed facing said circular track in the same plane, in between said magnet and a circumference of said ferrous target.

6. The apparatus of claim 1 wherein said magnetoresistive sensors are placed underneath said circular track, in between the circumference of said ferrous target and said magnet.

7. The apparatus of claim 1 wherein said first magnetoresistive sensor is connected to said second magnetoresistive sensor rotated with respect to one another in a bridge configuration.

8. The apparatus of claim 1 wherein said output signals are converted to digital signals.

9. The apparatus of claim 1 wherein said plurality of intertwined magnetoresistive sensors are magnetically biased with said magnet in close proximity to said plurality of intertwined magnetoresistive sensors.

10. The apparatus of claim 1 wherein said magnetoresistive sensors comprise at least one AMR component.

11. The apparatus of claim 1 further comprising a calculation component to analyze said output signal, wherein said calculation component is a microprocessor.

12. The apparatus of claim 1 further comprising a data storage device to save data produced by said apparatus.

13. A magnetic sensing method comprising:
   rotating a ferrous target, wherein said ferrous target comprises a plurality of teeth and a plurality of slots forming a circular track;
   placing a magnet proximate to said ferrous target having a circular track, wherein the magnet generates a magnetic field between the magnet and the circular track; and
   placing a plurality of intertwined magnetoresistive sensors on the same space on a substrate such that the plurality of intertwined magnetoresistive sensors sense changes in the magnetic field generated by the magnet, said plurality of intertwined magnetoresistive sensors comprising a first magnetoresistive sensor offset from a second magnetoresistive sensor, wherein said first magnetoresistive sensor and said second magnetoresistive sensor together produce output signals representative of magnetic flux of the magnetic field generated by the magnet and flowing through said first magnetoresistive sensor and said second magnetoresistive sensor, wherein said first magnetoresistive sensor and said second magnetoresistive sensor are reactive to gap and angular changes in said circular track of said ferrous target, such that said output signals from said first magnetoresistive sensor and said second magnetoresistive sensor are naturally shifted in phase in order to achieve a magnetically biased magnetoresistive speed and direction sensor.

14. The method of claim 13 wherein an integrated circuit is formed on said substrate.

15. The method of claim 13 wherein said circular track comprises a plurality of teeth and slots.

16. The method of claim 13 further comprising analyzing said output signal comprising a calculation component, wherein said calculation component is a microprocessor.

17. The method of claim 13 further comprising saving data produced by said method to a data storage device.

18. The method of claim 13 further comprising:
   placing said magnetoresistive sensors facing said circular track in the same plane, in between the circumference of said ferrous target and said magnet.

19. The method of claim 13 further comprising:
placing said magnetoresistive sensors underneath said circular track, in between the circumference of said ferrous target and said magnet.

20. The method of claim 13 further comprising:
connecting said first magnetoresistive sensor to said second magnetoresistive sensor rotated with respect to one another in a bridge configuration.

\* \* \* \* \*